(12) United States Patent
Seidenberg et al.

(10) Patent No.: US 9,578,450 B2
(45) Date of Patent: Feb. 21, 2017

(54) SHORT-RANGE COMMUNICATION DEVICE WITH SENDER AND RECEIVER

(71) Applicant: P3 Communications GmbH, Aachen (DE)

(72) Inventors: Peter Seidenberg, Aachen (DE); Marc Peter Althoff, Monchengladbach (DE)

(73) Assignee: P3 Communications GmbH, Aachen (DE)

( * ) Notice: Subject to any disclaimer, the term of this patent is extended or adjusted under 35 U.S.C. 154(b) by 0 days.

(21) Appl. No.: 14/841,840

(22) Filed: Sep. 1, 2015

(65) Prior Publication Data

US 2016/0066129 A1    Mar. 3, 2016

(30) Foreign Application Priority Data

Sep. 1, 2014 (DE) .......................... 10 2014 112 575
Dec. 18, 2014 (DE) .......................... 10 2014 118 938

(51) Int. Cl.
*H04B 7/00* (2006.01)
*H04W 4/00* (2009.01)
(Continued)

(52) U.S. Cl.
CPC .............. *H04W 4/008* (2013.01); *H04W 12/04* (2013.01); *H04W 76/023* (2013.01)

(58) Field of Classification Search
CPC ..... H04W 12/04; H04W 4/008; H04W 76/023
(Continued)

(56) References Cited

U.S. PATENT DOCUMENTS

2003/0190046 A1* 10/2003 Kamerman ............. H04L 9/006
                                                        380/286
2010/0082988 A1*  4/2010 Huebner ................. H04L 9/083
                                                        713/171
(Continued)

FOREIGN PATENT DOCUMENTS

DE          202014004802 U1     8/2014

*Primary Examiner* — Tan H Trinh
(74) *Attorney, Agent, or Firm* — Woodard, Emhardt, Moriarty, McNett & Henry LLP

(57) ABSTRACT

The invention relates to a process to check the pairing of a Bluetooth Low Energy (BLE) transmitter with a BLE receiver, comprising the following steps:
  Transmitting to the BLE transmitter of a function for generating a sequence of data packets, each data packet generated in accordance with the function having at least one identification value, one major value, and/or one minor value, and at least two data packets of the sequence having different identification values, major values, and/or minor values;
  Sending, at intervals, by the BLE transmitter of the data packets of at least one sequence generated by the BLE transmitter in accordance with the function;
  Receiving, by the BLE receiver, of at least part of the sequence of data packets transmitted by the BLE transmitter;
  Checking, by the BLE receiver, of at least part of the received sequence for whether it correlates and/or agrees with the function; and, if it does correlate and/or agree;
  Generating by the BLE receiver of a pairing signal for the BLE transmitter.

18 Claims, 2 Drawing Sheets

(51) Int. Cl.
*H04W 76/02* (2009.01)
*H04W 12/04* (2009.01)

(58) Field of Classification Search
USPC ..... 455/41.1, 41.2, 574, 67.11, 91; 713/171, 713/193, 150, 176; 714/748; 380/274, 286; 370/310
See application file for complete search history.

(56) References Cited

U.S. PATENT DOCUMENTS

| | | | | |
|---|---|---|---|---|
| 2011/0022916 A1* | 1/2011 | Desai | | G06F 1/3203 714/748 |
| 2012/0220351 A1* | 8/2012 | Kerai | | H04W 52/0229 455/574 |
| 2012/0258669 A1* | 10/2012 | Honkanen | | G01S 3/46 455/67.11 |
| 2013/0188538 A1* | 7/2013 | Kainulainen | | G01S 3/48 370/310 |
| 2013/0262526 A1* | 10/2013 | Miyata | | G06F 17/30115 707/803 |
| 2013/0281084 A1 | 10/2013 | Batada et al. | | |
| 2014/0220883 A1 | 8/2014 | Emigh et al. | | |
| 2014/0342670 A1* | 11/2014 | Kang | | H04W 24/08 455/41.2 |
| 2015/0036823 A1* | 2/2015 | Graube | | H04W 12/02 380/274 |
| 2015/0056920 A1* | 2/2015 | Huttunen | | H04B 7/26 455/41.2 |
| 2015/0170133 A1* | 6/2015 | Love | | G06Q 20/3224 705/44 |
| 2015/0215781 A1* | 7/2015 | Reed | | H04L 9/3236 726/5 |
| 2015/0271667 A1* | 9/2015 | Bernsen | | H04L 63/06 713/171 |
| 2015/0278867 A1* | 10/2015 | Lerman | | G06Q 30/0261 705/14.58 |
| 2015/0281877 A1* | 10/2015 | Walden | | H04W 4/008 455/41.2 |
| 2015/0281878 A1* | 10/2015 | Roundtree | | H04W 4/008 455/41.2 |
| 2015/0326603 A1* | 11/2015 | Deisinger | | H04L 69/166 726/22 |
| 2016/0027399 A1* | 1/2016 | Wilde | | G06F 13/382 345/520 |
| 2016/0050530 A1* | 2/2016 | Corbalis | | G06Q 20/3278 455/456.1 |
| 2016/0157048 A1* | 6/2016 | Kerai | | H04W 84/18 455/41.2 |
| 2016/0178723 A1* | 6/2016 | Jiao | | H04L 27/122 375/272 |

* cited by examiner

SHORT-RANGE COMMUNICATION DEVICE WITH SENDER AND RECEIVER

CROSS-REFERENCE TO RELATED APPLICATIONS

This application claims priority of German Application No. 10 2014 112 575.4 filed Sep. 1, 2014 and German Application No. 10 2014 118 938.8 filed Dec. 18, 2014, which are both hereby incorporated by reference.

BACKGROUND

The invention relates to a process for checking a pairing of a Bluetooth Low Energy (BLE) transmitter with a Bluetooth Low Energy receiver. The invention also relates to an arrangement with the BLE transmitter and the BLE receiver.

Bluetooth Low Energy, also called Bluetooth LE, Bluetooth Smart, Bluetooth Ultra Low Power, or Wibree, is a wireless technology that allows the networking of devices in a surrounding area of about 10 meters. Compared with other Bluetooth protocols, BLE is characterized by clearly lower power consumption and correspondingly lower costs. In 2013, Apple introduced a proprietary standard based on Bluetooth Low Energy that is known to specialists under the brand iBeacon. An iBeacon is a signal transmitter that transmits signals at fixed time intervals. As a rule, the signals comprise a so-called Universally Unique Identifier (UUID) value, a major value, and a minor value, the UUID being a 128-bit digit, and the major and minor values being 16-bit digit. As a rule, the UUID value, major value, and minor value are transmitted in plain text, unencrypted.

Now if a receiver, for example a smartphone with an application installed on it that is designed to receive and analyze iBeacon signals, comes within range of an iBeacon, the application can identify the UUID of the iBeacon and measure its signal strength. If at least three iBeacons are received, trilateration or fingerprinting processes can be used to calculate the position of the smartphone. The application can activate site-specific services on the smartphone and/or cause it to display site-specific information. This allows, for example, automatic display, on a visitor's smartphone, of specific information about special offers in a store, notes about lecture materials in an educational institution, or information about a current exhibit in museums.

Taking a specialized electronics store as an example of a store, the UUID value can be assigned to the chain of specialized electronics stores, while the major value can stand for a specific specialized store in a city, from among a number of specialized stores. The minor value can be assigned to a specialized department in the specific specialized store, for example, in the case of the specialized electronics store, the television department, the computer department, or the camera department. Now, if a customer visits the specialized store, and activates an iBeacon application of the specialized electronics store chain on his smartphone, it can be determined, on the basis of the iBeacons installed in the specialized store, whether the visitor is in the television department, the computer department, or the camera department.

This allows the iBeacon application to display, on the visitor's smartphone, targeted product information about special offers, background information on offered products, or similar things. However, since the UUID value, major value, and minor value are transferred in plain text, unencrypted, this information can also be used by other applications of third parties different from the specialized electronics store chain. For example, it is conceivable that the visitor's smartphone has a third-party application installed on it that shows the visitor product information and prices of alternative vendors, which naturally is not in the interest of the specialized electronics store chain.

SUMMARY

For this reason, it is a goal of the invention to specify a process and an arrangement which allows a Bluetooth Low Energy transmitter to be paired with a Bluetooth Low Energy receiver in an especially simple and secure way, This is accomplished by the features of the independent claims. Advantageous embodiments are specified in the dependent claims.

Accordingly, the goal is achieved by a process to check a pairing of a Bluetooth Low Energy (BLE) transmitter with a BLE receiver, comprising the following steps: Transmitting to the BLE transmitter of a function for generating a sequence of data packets, each data packet generated in accordance with the function having at least one identification value, one major value, and/or one minor value, and at least two data packets of the sequence having different identification values, major values, and/or minor values; sending, at intervals, by the BLE transmitter of the data packets of at least one sequence generated by the BLE transmitter in accordance with the function; receiving, by the BLE receiver, of at least part of the sequence of data packets transmitted by the BLE transmitter; checking, by the BLE receiver, of at least part of the received sequence for whether it correlates and/or agrees with the function; and, if it does correlate and/or agree, generating by the BLE receiver of a pairing signal for the BLE transmitter.

Thus, an essential point of the invention is that the BLE transmitter does not transmit a fixed or constant data packet, that is, a fixed identification value, major value, and/or minor value, but rather the previously mentioned values change. For example, it is possible for the time sequence of major value to be "1 3 5 7 3 2 1", that is, the first major value transmitted is "1", the second major value transmitted is "3", etc. As for the BLE receiver, however, it is able, on the basis of the function, to pair with a unique, specific BLE transmitter from a number of BLE transmitters, for example. In this case, that is, if there are multiple BLE transmitters, each individual BLE transmitter preferably transmits the data packets according to another function.

The proposed process has the result that although the identification value, major value, and/or minor value are also transmitted in plain text, that is, unencrypted, the previously mentioned values are not constant, but rather change over time in accordance with the function.

This means that only a BLE receiver that knows the function can pair, preferably uniquely, with the BLE transmitter. However, if another BLE transmitter does not know the function, that is, if it cannot check data packets it receives with respect to the function, this other BLE receiver cannot uniquely pair with the BLE transmitter transmitting the data packets. With reference to the example described at the beginning, this means, for example, that only the application provided by the specialized electronics store chain knows the function and, for this reason, also that only the application provided by the specialized electronics store chain can pair with a specific BLE transmitter. However, a third-party vendor's application that does not know the function cannot pair with the BLE transmitter transmitting the data packets.

In theory, the Bluetooth Low Energy transmitter can have any design, that is, according to alternative embodiments, it can be a low-energy and/or short-range communication device with a transmitter for transmitting the data packets. For this reason, according to this alternative embodiment it can also use a protocol other than Bluetooth Low Energy. It is quite especially preferred for the communication between the Bluetooth Low Energy transmitter and the Bluetooth Low Energy receiver to be use the Bluetooth Low Energy, Bluetooth LE, Bluetooth Smart, abbreviated as BLE, Bluetooth Ultra Low Power, and/or Wibree protocol as the wireless technology, it being further preferred for the BLE transmitter to be characterized by extremely low power consumption. It is further preferred for the BLE transmitter to have a controller, for example a microprocessor or a microcontroller, that controls the transmission of the data packets. It is preferred for the transmission to take place at regular and/or periodic intervals, for example every 50, 100, 200, or 500 milliseconds. It is even more preferred for the Bluetooth Low Energy transmitter and/or the Bluetooth Low Energy receiver to transmit in the 2.4 gigahertz band.

It is quite especially preferred for the BLE transmitter to be in the form of an iBeacon, that is, in accordance with a proprietary standard for navigation in enclosed spaces introduced by Apple that is known under the brand iBeacon. It is even more preferred for the BLE transmitter to be designed in such a way that although data packets can be transmitted, no data packets in the form of an identification value, a major value, and/or a minor value can be received. It is further preferred for the BLE transmitter to be designed in such a way that data packets are transmitted using so-called Bluetooth low energy proximity sensing. The range of the BLE transmitter is preferably up to 30 meters, up to 10 meters, up to 2 meters and/or up to 50 cm, it being even more preferable for the signal strength of the transmitted data packet to be adjustable. Transmission at intervals preferably means that one data packet is transmitted at each discrete interval. Two transmitted data packets differ from one another by different major values, while their identification values can be the same. It is also possible for the function to provide that three transmitted data packets of a single sequence all have the same identification values and minor values, however the three transmitted major values have two different values.

A sequence preferably means a finite or infinite number of data packets that are formed using the function as a law of formation. In other words, the function determines the identification value, the major value, and/or the minor value of each individual data packet of the sequence. The received sequence can be checked in various ways, among others by the BLE receiver using the function to create a comparison sequence, preferably a single one, which is then compared with the received sequence or part of it, or with several received sequences. For example, if the comparison sequence has the values "1 3 2", and the received sequence has the values "2 1 3 2 1", then there is a correlation or a agreement between the comparison sequence and three data packets of the received sequence. To receive the sequence, the BLE receiver has an antenna, just as the BLE transmitter does. It is further preferred for the steps of the process to follow one another sequentially as needed, other combinations also being possible, however.

According to a preferred further development, the process comprises the step of the BLE transmitter transmitting the data packets at periodic intervals and/or the BLE transmitter repeatedly transmitting the sequence of data packets generated. Thus, this further development provides that the data packets be periodically transmitted one after one other at intervals of 100 milliseconds, and/or that after the sequence is transmitted it be repeated a finite or infinite number of times, that is, the BLE transmitter transmits the data packets generated in a continuous manner. It is further preferred for the transmission of an entire sequence to last 1 second, 2 seconds, or 5 seconds. The fact that the data packets are transmitted not constantly, but rather only at intervals, preferably periodic intervals, means that the BLE transmitter requires very little electrical energy, and preferably has a battery that allows operation for several months or even years.

According to an even more preferred embodiment, the identification value is assigned to the BLE transmitter, and only the major value and/or minor value for each data packet of the sequence are generated in accordance with the function. According to this embodiment, the identification value is preferably the same for every transmitted data packet, so that in theory identification or pairing of the BLE transmitter is possible on the basis of the identification value. However, since the major value and/or minor value for each data packet of the sequence is generated in accordance with the function, an unauthorized third-party application still cannot identify in which specific specialized electronics store the BLE transmitter is installed, following the previous example.

According to an even more preferred embodiment, the BLE transmitter is in the form of a BLE sensor and the BLE receiver is in the form of a mobile telephone, smartphone, notebook, tablet computer, and/or computer, the process having the following steps: Installation of a BLE application on the BLE receiver; transmission of the function from a management server to the BLE receiver and/or the BLE transmitter; execution of the BLE application on the BLE receiver to pair the BLE transmitter, comprising the steps: reception, by the BLE receiver, of at least one data packet transmitted by the BLE transmitter; selection, by the BLE application, of a BLE transmitter on the basis of an identification value received in the data packet; generating, by the BLE application on the basis of the transmitted function, of a comparison sequence of comparison major values and/or comparison minor values; comparison, by the BLE application, of the comparison sequence of comparison major values and/or comparison minor values that is generated with the received major values and/or minor values of at least one received sequence to determine whether it agrees; and/or if it does agree, generation and/or display of the pairing signal by the BLE application.

Thus, this embodiment provides that the BLE sensor is in the form of an iBeacon, for example, the function being communicated to the iBeacon from a management server. Such transmission or communication can be done, for example, by programming the iBeacon using a programming device, for example a laptop, and/or it can be wireless. The BLE receiver is in the form of a smartphone, for example, whose operating system is iOS or Android, for example. The smartphone has the BLE application installed on it that allows pairing with a BLE transmitter. Now if there is no change in the identification value, as in the previously described embodiment, the BLE application can, on the basis of a received identification value, pair with a BLE transmitter, for example, a specialized electronics store chain. However, if the BLE transmitter continuously varies the major value and/or minor value on the basis of the function, following the previously mentioned embodiment, the BLE application creates a comparison sequence on the basis of the previously transmitted function. The comparison sequence contains comparison major values and/or comparison minor values, and this sequence is then compared with the sequence of the BLE transmitter that is received by the BLE application or the BLE receiver. If agreement is found, the BLE application generates the pairing signal, which can, in its simplest form, comprise a simple display on the smartphone. It is also possible for the pairing signal to establish a connection with the management server or with another service provider, to display received contents of a service provider on the smartphone in response to that.

According to an even more preferred embodiment, the sequence comprises at least 3, 5, 7, or 10 data packets. It is further preferred for at least 3, 5, 7, or 10 data packets of the sequence to have different identification values, major values, and/or minor values. However, other combinations are also possible in addition to these.

As was already previously mentioned, a fundamental idea of the invention is that the identification value, major value, and/or minor value transmitted at intervals are varied according to a time-dependent function, with the result that at least two different identification values, major values, and/or minor values are transmitted. A quite especially preferred further development provides that the process involve the step of generating the identification value, major value, and/or minor value of each transmitted data packet by means of a coding process. The coding process generates a periodic pseudorandom sequence, and can be based on the spread spectrum technique of GSM, in particular the random frequency hopping spread spectrum. Such a function is especially effective at preventing unauthorized access by third parties.

According to an even more preferred embodiment, the function has a public key and a private key corresponding to the public key, the BLE transmitter and the BLE receiver also having a time signal, and the process comprising the steps: transmitting of only the public key to the BLE transmitter as a function; use of the public key by the BLE transmitter for encrypting a current time stamp of the time signal of the BLE transmitter to generate the identification value of a data packet; decrypting, by the BLE receiver on the basis of the private key, of an identification value received from the BLE transmitter to check the received sequence; and if the decrypted identification value agrees with a current time stamp of the time signal of the BLE receiver, generating of the pairing signal by the BLE receiver. Thus, according to this embodiment, the BLE transmitter transmits a time stamp of the time signal in encrypted form as an identification value, which the BLE receiver can then receive and decrypt. To accomplish this, it is preferable for the time signals of the BLE transmitter and the BLE receiver to be synchronized. It is further preferred for an identification value received from the BLE transmitter to be correspondingly decrypted by means of the private key, compared with a number of different time stamps of the time signal of the BLE receiver in order to determine the "fitting" time stamp in case of a slight deviation of the time signals of the BLE transmitter and BLE receiver. It is preferable for a time stamp to represent the current time of day. Instead of the pairing signal, it is alternatively or additionally possible for a major value and/or a minor value to be encrypted.

Analogous to the previously mentioned further development, one way to accomplish the goal of the invention relates to a process to check the pairing of a Bluetooth Low Energy (BLE) transmitter with a BLE receiver, with the steps: transmission of a public key to the BLE transmitter; transmission at intervals, by the BLE transmitter, of a current time stamp of a time signal of the BLE transmitter, encrypted by means of the public key, as an identification value assigned to the BLE transmitter; decryption, by the BLE receiver, of an identification value received from the BLE transmitter by means of a private key associated with the public key; comparison, by the BLE receiver, of the decrypted identification value with a current time stamp of a time signal of the BLE receiver; and, if the decrypted identification value agrees with a current time stamp, generating, by the BLE receiver, of a pairing signal. In every case, the previously mentioned process represents an especially simple way in which a BLE transmitter can then be securely and reliably paired with a BLE transmitter. Since a third party does not possess the private key, this means that there is also no way for the third party to decrypt the signal transmitted from the BLE transmitter, that is, a data packet or the identification value. In this connection, it is especially preferred, that the encryption and decryption be done according to an asymmetric cryptographic process, in particular RSA. Other asymmetric cryptographic processes are also conceivable in addition to this.

According to a further development of the previously mentioned process, the BLE transmitter is in the form of a BLE sensor and the BLE receiver is in the form of a mobile telephone, smartphone, notebook, tablet computer, and/or computer, the process having the following steps: installation of a BLE application on the BLE receiver; transmission of the public key from a management server to the BLE transmitter and/or transmission of the private key from the management server to the BLE receiver; execution of the BLE application on the BLE receiver to decrypt the identification value received from the BLE transmitter; and/or, if it agrees, display and/or generation of the pairing signal by the BLE application. The transmission can, on the one hand, be wireless, for example through a wireless mobile telephony connection, but it can also be through a USB stick, a programming device, or something similar. Such a further development allows secure and reliable pairing of the BLE transmitter in an especially simple way.

In theory, the identification value, major value, and/or minor value can have any form. However, according to an especially preferred further development the identification value is a 128-bit number, the major value is a 16-bit number, and/or the minor value is a 16-bit number. It is further preferred for the identification value to be in the form of a Universally Unique Identifier, abbreviated as UUID, in particular according to RFC 4122.

According to a preferred further development, the previously mentioned process has the following additional steps: if there is agreement, transmission, by the BLE application, of the pairing signal to the management server to trigger a io payment process; and/or if there is agreement, transmission, by the BLE application, of additional information to the management server. Thus, if the result of the check is positive, that is, if agreement has been found, according to the proposed embodiment the BLE application can transfer the pairing signal to the management server to trigger further actions in this way. For example it is conceivable that the BLE transmitter is installed in a regular bus, while a passenger carries a smartphone with the BLE application. Now, after the passenger has boarded the bus, the pairing between the BLE transmitter and the BLE receiver is checked on the basis of the proposed process, and, if it agrees, the pairing signal on the smartphone indicates that the passenger has a valid ticket, on the one hand. On the other hand, the BLE application can transfer the pairing signal to the management server, to trigger a payment process for a passenger ticket. In the case of a smartphone, it is conceivable that the payment process for a ticket can be handled on a monthly bill for the costs incurred by using the smartphone, for example voice calls and data. Additional information can be transferred to the management server, for example the passenger's name or other unique identification assigned to the passenger. In this way, the proposed process makes it especially simple to check whether a passenger is entitled to incur costs to use a bus, and simultaneously post the incurred costs on a monthly smartphone bill.

The goal of the invention is further accomplished by an arrangement with a Bluetooth Low Energy (BLE) transmitter and a BLE receiver, the BLE transmitter being designed to transmit, at intervals, an identification value assigned to the BLE transmitter, a major value, and/or a minor value, and in addition to change the identification value, major value, and/or minor value according to a predetermined function in such a way that at least two transmitted identification values, major values, and/or a minor values are different, and the BLE receiver being designed to receive the identification value, major value, and/or minor value transmitted from the BLE transmitter, to check whether the received identification value, major value, and/or minor value agree with the function, and, if they agree, to generate a pairing signal. The proposed arrangement makes it especially simple to validate [pairing] between a BLE transmitter and a BLE receiver.

According to an especially preferred further development, the identification value, major value, and/or minor value are changed according to a function which is a coding process that generates a pseudorandom sequence. According to an even more preferred embodiment, the function comprises a public key and a private key corresponding to the public key, the BLE transmitter and the BLE receiver having a time signal, the change involving encryption of a current time stamp of the time signal of the BLE transmitter on the basis of the public key to generate the identification value, major value, and/or minor value, the checking involving decryption of a received identification value, a received major value, and/or a received minor value on the basis of the private key, and comparison of a thus decrypted identification value, a decrypted major value, and/or a decrypted minor value with a current time stamp of a time signal of the BLE receiver.

For the person skilled in the art, other advantages and preferred further developments of the proposed arrangement follow by analogy with the previously described process.

The invention is explained in detail below on the basis of preferred embodiments, which make reference to the attached drawing.

DETAILED DESCRIPTION OF THE DRAWINGS

Figure 1:
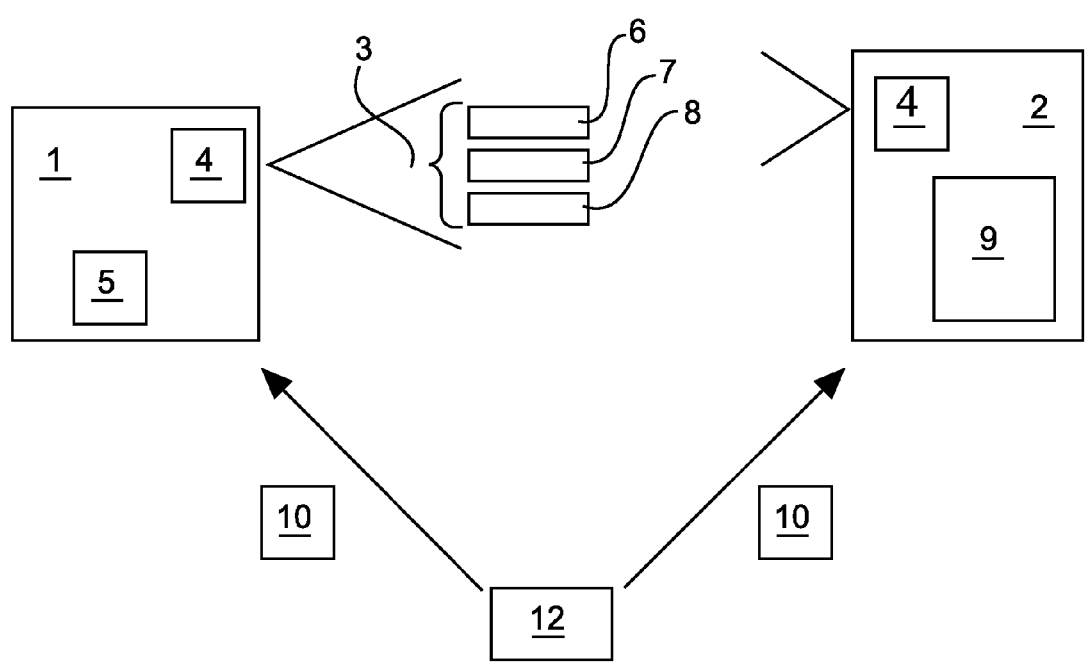
FIG. 1 A schematic view of an arrangement with a BLE transmitter and a BLE receiver in accordance with a preferred embodiment of the invention.

FIG. 1 is a schematic view of a preferred embodiment of the invention with a Bluetooth Low Energy transmitter 1 and a Bluetooth Low Energy receiver 2. Here the Bluetooth Low Energy transmitter 1, abbreviated as BLE transmitter 1, is in the form of a so-called iBeacon, and transmits a data packet 3 as a signal at periodic intervals. To do this, BLE transmitter 1 uses Bluetooth Low Energy as its wireless technology. Specifically, the BLE transmitter has an antenna 4 in it as a means of transmission to transmit data packet 3, a microcontroller 5 being provided to control the BLE transmitter. Data packet 3 has an identification value 6 with a length of 128 bits, a major value 7 with a length of 16 bits, and a minor value 8 with a length of 16 bits. Data packet 3 is periodically transmitted by antenna 4, with a period of every hundred milliseconds. Here BLE receiver 2 is in the form of a smartphone, which has a BLE application 9 installed on it. The BLE receiver, which also uses Bluetooth Low Energy as its wireless technology, corresponding to BLE transmitter 1, also has an antenna 4 to receive the data packets 3 transmitted by BLE transmitter 1.

Now the invention provides that at every periodic transmission, that is, for example, every hundred milliseconds, the data packet 3 that is transmitted is not always the same, that is BLE transmitter 1 does not always, for example over a time period of several minutes, hours, or days, transmit the same identification value 6, the same major value 7, and/or the same minor value 8. Instead, different data packets 3 are transmitted, using a function 10 as a law of formation.

Figure 2:
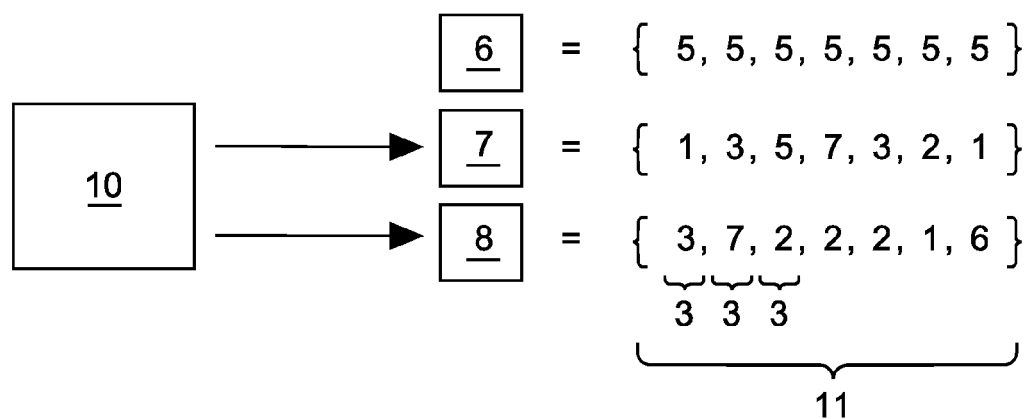
FIG. 2 A schematic overall view of a first embodiment of the embodiment shown in FIG. 1.

As can be seen from the schematic view in FIG. 2, the major values 7 formed according to the function 10 form the sequence 11 "1 3 5 7 3 2 1". In the same way, the minor value 8 changes according to function 10 to form the sequence 11 "3 7 2 2 2 1 6 5", while in this case identification value 6 has the constant value "5". This means that in this embodiment a sequence 11 of seven data packets 3 is generated by function 10, the identification value 6 of each data packet 3 remaining constant, however the major value 7 and minor value 8 changing as previously mentioned and being correspondingly transmitted. Thus, the first data packet 3 of sequence 11 generated by the BLE transmitter 1 in accordance with function 10 comprises the sample value 5 as identification value 6, the sample value 1 as major value 7, and the value 3 as minor value 8.

The following data packet 3 transmitted by BLE transmitter 1, which is transmitted a hundred milliseconds after the first data packet 3, comprises the value 5 as identification value 6, the value 3 as major value 7, and the value 7 as minor value 8. Thus, according to this embodiment, the identification value 6 always remains the same, while both major value 7 and minor value 8 change according to a time-dependent function. After the seven data packets 3 of sequence 11 have been transmitted, the BLE transmitter 1 infinitely repeats the transmission of sequence 11, that is, the eighth data packet 3 it transmits has 1 as its major value 7. In theory, the sequence can have any number of data packets, for instance seven data packets in the example shown in FIG. 2, however in every case at least two data packets 3 of the sequence 11 have different identification values 6, major values 7, and/or minor values 8.

Now if an unauthorized receiver receives the data packets 3, which the BLE transmitter 1 does transmit in plain text, although it is possible for the unauthorized receiver to assign BLE transmitter 1 on the basis of the identification value 6, the unauthorized receiver cannot uniquely assign BLE transmitter 1, since major value 7 and minor value 8 continually change. Here it is assumed that there are multiple BLE transmitters 1, each of which transmit the same identification value 6.

As was already explained at the beginning, BLE receiver 2 receives the data packets 3 transmitted by the BLE transmitter and checks whether the sequence 11 received in this way agrees with function 10. If agreement is found, the BLE transmitter 2 generates a pairing signal. In specific terms, after the BLE application 9 is installed on the BLE receiver 2, the function 10 is transferred from a management server 12 to both the BLE receiver 1 and BLE transmitter 2. The transfer is done using a wireless communication process; in particular, since the BLE receiver 2 is in the form of a smartphone, this is done over a mobile telephony network by means of UMTS, LTE, or something similar.

To check the received sequence 11, the BLE application 9 creates a comparison sequence on the basis of the function 10 received from the management server 12. After that, the BLE application 9 compares the comparison sequence generated in this way with the received sequence 11 to determine whether it agrees. If it does agree, the BLE application 9 displays this, for example on a display of the smartphone, and/or activates another function. This other function can be, for example, transfer of predetermined contents, for example from the management server 12 to the smartphone.

Here identification value 6 is in the form of a 128-bit Universally Unique Identifier, abbreviated as UUID, while both major value 7 and minor value 8 are 16-bit numbers. In this case, the major values 7 and minor values 8 of each data packet 3 to be transmitted are generated by means of a coding process to generate a function 10 in the form of a pseudorandom sequence. Thus, while the identification value 6 for each data packet 3 of the sequence 11 remains the same, as is also shown in FIG. 2, the major value 7 and minor value 8 change; this change involves the probability and discrete value of these variables, and it is determined by pseudorandom numbers. Since BLE receiver 2 knows the function 10, as described above, BLE receiver 2 or BLE application 9 is able to determine, on the basis of the data packets 3 received, whether there is agreement.

Figure 3:
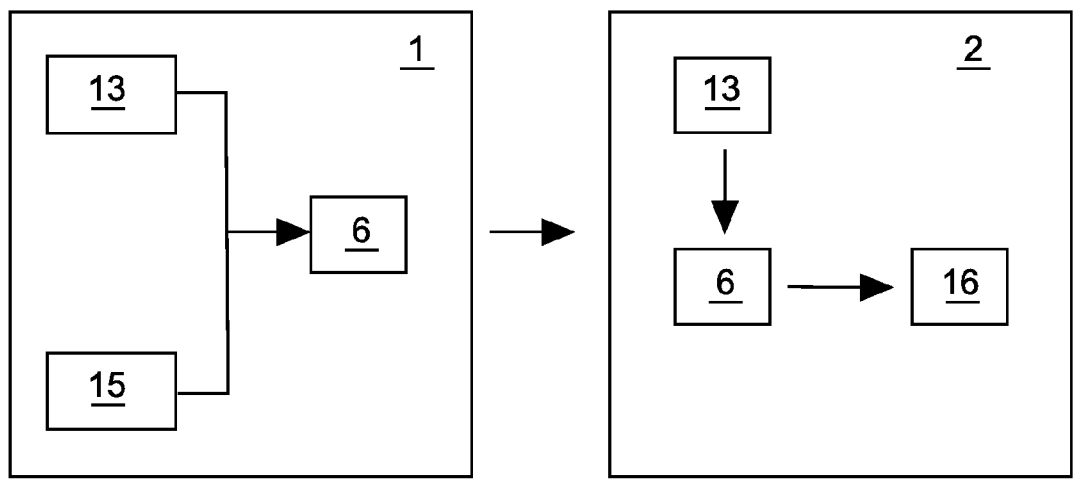
FIG. 3 A schematic overall view of a second embodiment of the embodiment shown in FIG. 1.

According to another embodiment shown in FIG. 3, function 10 has a public key 13 and a private key 14 corresponding to the public key 13. Only the public key 13 is transferred to the BLE transmitter 1 as a function 10, BLE receiver 2 having the private key 14 as a function 10. A current time stamp 15 of BLE transmitter 2 is encrypted by means of the public key 13 to generate identification value 6. The identification value 6 encrypted in this way is transferred to BLE receiver 2. BLE receiver 2 then decrypts the received identification value 6 on the basis of the private key 14, and compares it with a current time stamp 15 of the BLE receiver 2.

If there is agreement between the decrypted identification value 6 and the current time stamp 15 of BLE receiver 2, BLE receiver 2 generates the pairing signal. This process presumes that both the BLE transmitter 1 and the BLE receiver 2 have a synchronized time signal to supply the time stamp 15. In the mentioned process, it might be necessary to compare the identification value 6 decrypted by the BLE receiver 2 not only with the current time stamp 15, but rather also with some time stamps of the BLE transmitter 2 immediately before or after it, and compensate for the time it takes for the identification value 6 to be transferred from the BLE-Sender 1 to the BLE receiver. Instead of the identification value 6, it is alternatively possible to use major value 7 and/or minor value 8 in the same way. Here the encryption and decryption are done according to an asymmetric cryptographic technique, and RSA is used for the public key 13 and private key 14.

The result is that the proposed process and the proposed arrangement provide an especially simple and reliable way of pairing a BLE transmitter 1 with a BLE receiver 2 that is secure from falsification. For example, the proposed process or the proposed arrangement allows the following use in a regular bus that is equipped with the BLE transmitter 1. If a passenger has the BLE receiver 2, for example a smartphone that has the BLE application 9 installed on it, and the passenger boards the BUS, the BLE application 9 can check the pairing. If the result of the check is positive, the BLE application 9 can, on the one hand, show the bus driver a valid ticket for the passenger, and, on the other hand it can automatically pay a fare for using the bus, for example by means of a payment server.

LIST OF REFERENCE NUMBERS

BLE transmitter 1
BLE receiver 2
Data packet 3
Antenna 4
Microcontroller 5
Identification value 6
Major value 7
Minor value 8
BLE application 9
Function 10
Sequence 11
Management server 12
Public key 13
Private key 14
Current time stamp of BLE transmitter 15
Current time stamp of BLE receiver 16

We claim:

1. A process to check a pairing of a Bluetooth Low Energy (BLE) transmitter in the form of a BLE sensor with a BLE receiver in the form of a mobile telephone, smartphone, notebook, tablet computer, and/or computer, the process comprising the following steps:
Transmitting to the BLE transmitter of a function for generating a sequence of data packets, each data packet generated in accordance with the function having at least one identification value, one major value, and/or one minor value, and at least two data packets of the sequence having different identification values, major values, and/or minor values;
Sending, at intervals, by the BLE transmitter of the data packets of at least one sequence generated by the BLE transmitter in accordance with the function;
Receiving, by the BLE receiver, at least part of the sequence of data packets transmitted by the BLE transmitter;
Checking, by the BLE receiver, at least part of the received sequence for whether it correlates and/or agrees with the function; and, if it correlates and/or agrees,
Generating, by the BLE receiver, a pairing signal for the BLE transmitter;
Installing a BLE application on the BLE receiver;
Transmitting the function from a management server to the BLE receiver and/or the BLE transmitter;
Executing the BLE application on the BLE receiver to pair the BLE transmitter, comprising the steps:
Receiving, by the BLE receiver, of at least one data packet transmitted by the BLE transmitter;
Selecting, by the BLE application, of a BLE transmitter on the basis of an identification value received in the data packet;
Generating, by the BLE application, on the basis of the transmitted function, of a comparison sequence of comparison major values and/or comparison minor values;

Comparing, by the BLE application, of the comparison sequence of comparison major values and/or comparison minor values that is generated with the received major values and/or minor values of at least one received sequence to determine whether it agrees; and/or if it does agree, generating and/or displaying of the pairing signal by the BLE application.

2. The process described in claim 1, comprising the step of the BLE transmitter transmitting the data packets at periodic intervals and/or the BLE transmitter repeatedly transmitting the sequence of data packets generated.

3. The process described in claim 1, wherein the identification value is assigned to the BLE transmitter, and only the major value and/or minor value for each data packet of the sequence is generated in accordance with the function.

4. The process described in claim 1, wherein the sequence comprises at least 3, 5, 7, or 10 data packets and/or at least 3, 5, 7, or 10 data packets of the sequence have different identification values, major values, and/or minor values.

5. The process described in claim 1, wherein the process comprises the following step:

Generating, by the BLE transmitter, the identification value, the major value, and/or the minor value of each data packet to be transmitted using a spread spectrum technique as the function.

6. The process described in claim 1, wherein the function has a public key and a private key corresponding to the public key and the BLE transmitter and the BLE receiver have a time signal, with the steps:

Transmitting only the public key to the BLE transmitter as a function;

Encrypting a current time stamp of the time signal of the BLE transmitter by using the public key to generate the identification value of a data packet by the BLE transmitter;

Decrypting, by the BLE receiver on the basis of the private key, an identification value received from the BLE transmitter to check the received sequence; and if the decrypted identification value agrees with a current time stamp of the time signal of the BLE receiver, generating, by the BLE receiver, of the pairing signal.

7. The process described in claim 1, wherein the encryption and decryption are done according to an asymmetric cryptographic process.

8. The process described in claim 1, wherein the BLE transmitter is in the form of a BLE sensor and the BLE receiver is in the form of a mobile telephone, smartphone, notebook, tablet computer, and/or computer, the process having the following steps:

Installation of a BLE application on the BLE receiver;

Transmitting the public key from a management server to the BLE transmitter and/or transmitting the private key from the management server to the BLE receiver;

Executing of the BLE application on the BLE receiver to decrypt the identification value received from the BLE transmitter; and/or if it does agree, displaying and/or generating of the pairing signal by the BLE application.

9. The process described in claim 1, wherein the identification value is a 128-bit digit, the major value is a 16-bit digit, and/or the minor value is a 16-bit digit.

10. The process described in claim 1, with the steps:

if there is agreement, transmitting, by the BLE application, of the pairing signal to the management server to trigger a payment process; and/or if there is agreement, transmitting, by the BLE application, of additional information to the management server.

11. The process described in claim 1, comprising the step of the BLE transmitter transmitting the data packets at periodic intervals.

12. The process described in claim 1, wherein the identification value is assigned to the BLE transmitter, and only the major value for each data packet of the sequence is generated in accordance with the function.

13. The process described in claim 1, wherein the sequence comprises at least 3 data packets.

14. The process described in claim 1, wherein at least 3 data packets of the sequence have different identification values, major values, and/or minor values.

15. The process described in claim1, wherein the identification value is a 128-bit digit and the major value is a 16-bit digit.

16. The process described in claim 1, with the step:

if there is agreement, transmitting, by the BLE application, additional information to the management server.

17. The process described in claim 1, wherein the process comprises the following step:

generating, by the BLE transmitter, the identification value, the major value, and/or the minor value of each data packet to be transmitted using a frequency hopping spread spectrum technique-as the function.

18. The process described in claim 1, wherein the encryption and decryption are done according to a RSA asymmetric cryptographic process.

* * * * *

UNITED STATES PATENT AND TRADEMARK OFFICE
CERTIFICATE OF CORRECTION

PATENT NO. : 9,578,450 B2  
APPLICATION NO. : 14/841840  
DATED : February 21, 2017  
INVENTOR(S) : Peter Seidenberg Page 1 of 1

It is certified that error appears in the above-identified patent and that said Letters Patent is hereby corrected as shown below:

In the Specification

Please delete "io" in Column 6, Line 51.

Signed and Sealed this  
Eleventh Day of April, 2017

Michelle K. Lee  
*Director of the United States Patent and Trademark Office*